United States Patent
Gould et al.

(10) Patent No.: US 8,856,344 B2
(45) Date of Patent: Oct. 7, 2014

(54) METHOD AND SYSTEM FOR INTELLIGENT MANY-TO-MANY SERVICE ROUTING OVER EPP

(71) Applicant: Verisign, Inc., Reston, VA (US)

(72) Inventors: James Gould, Leesburg, VA (US); Marc Anderson, Ashburn, VA (US); Mahendra Jain, Sterling, VA (US)

(73) Assignee: Verisign, Inc., Reston, VA (US)

( * ) Notice: Subject to any disclaimer, the term of this patent is extended or adjusted under 35 U.S.C. 154(b) by 0 days.

(21) Appl. No.: 13/835,674

(22) Filed: Mar. 15, 2013

(65) Prior Publication Data

US 2013/0204838 A1     Aug. 8, 2013

Related U.S. Application Data

(63) Continuation-in-part of application No. 13/681,330, filed on Nov. 19, 2012, which is a continuation of application No. 12/543,462, filed on Aug. 18, 2009, now Pat. No. 8,327,019.

(51) Int. Cl.
   *G06F 15/173* (2006.01)
   *H04L 12/24* (2006.01)
   *H04L 29/06* (2006.01)

(52) U.S. Cl.
   CPC ............. *H04L 41/00* (2013.01); *H04L 63/10* (2013.01); *H04L 63/20* (2013.01)
   USPC .......... 709/226; 709/224; 707/609; 707/756; 707/722; 726/1; 726/4

(58) Field of Classification Search
   CPC .......... H04L 41/00; H04L 63/10; H04L 63/20
   USPC ....................................................... 709/226
   See application file for complete search history.

(56) References Cited

U.S. PATENT DOCUMENTS

| 5,892,946 | A  | 4/1999 | Woster et al. |
| 7,043,563 | B2 | 5/2006 | Vange et al. |
| 7,158,967 | B1 | 1/2007 | Turba et al. |

(Continued)

OTHER PUBLICATIONS

Hollenbeck, Extensible Provisioning Protocol, 2000, Verisign, pp. 1-4.*

(Continued)

*Primary Examiner* — Arvin Eskandarnia
(74) *Attorney, Agent, or Firm* — MH2 Technology Law Group, LLP

(57) ABSTRACT

Method and system for routing EPP requests over a network are provided. A routing system includes multiple frontend service interfaces, one or more gateways, a management server, and a backend service platform that provides multiple application services. The frontend service interfaces are addressable using virtual IP addresses ("VIP") and can be provided by the gateways. The routing system defines a many-to-many mapping between the frontend service interfaces and a set of services provided by the backend service platform. A requestor can send a request over EPP to a targeted service interface to access one or more backend services, by sending the request to a target IP or domain name that corresponds to a VIP associated with the targeted service interface. Using the many-to-many mapping and the VIP of the targeted service interface, the routing system can identify backend services sought by the request and provide the requestor with access to the backend services.

27 Claims, 6 Drawing Sheets

(56) References Cited

U.S. PATENT DOCUMENTS

| | | | |
|---|---|---|---|
| 7,280,999 B2 | 10/2007 | Chung et al. | |
| 7,310,686 B2 | 12/2007 | Uysal | |
| 7,418,471 B2 | 8/2008 | King et al. | |
| 7,546,368 B2 | 6/2009 | Drees et al. | |
| 7,600,042 B2 | 10/2009 | Lemson et al. | |
| 7,631,101 B2 | 12/2009 | Sullivan et al. | |
| 7,685,270 B1 | 3/2010 | Vermeulen et al. | |
| 7,694,016 B2 | 4/2010 | Halley | |
| 7,725,602 B2 | 5/2010 | Liu et al. | |
| 7,734,815 B2 | 6/2010 | Leighton et al. | |
| 7,761,570 B1 | 7/2010 | Halley | |
| 7,769,826 B2 | 8/2010 | Gustafsson | |
| 7,792,836 B2 | 9/2010 | Taswell | |
| 7,814,202 B2 | 10/2010 | Drees et al. | |
| 7,853,643 B1 | 12/2010 | Martinez et al. | |
| 7,925,747 B2 | 4/2011 | Kirwan et al. | |
| 7,925,782 B2 | 4/2011 | Sivasubramanian et al. | |
| 7,930,393 B1 | 4/2011 | Baumback et al. | |
| 7,933,951 B2 | 4/2011 | Sullivan et al. | |
| 8,103,511 B2 * | 1/2012 | Basson et al. | 704/278 |
| 2003/0005132 A1 | 1/2003 | Nguyen et al. | |
| 2003/0084057 A1 | 5/2003 | Balogh | |
| 2003/0084074 A1 | 5/2003 | Balogh et al. | |
| 2003/0084075 A1 | 5/2003 | Balogh et al. | |
| 2004/0039798 A1 | 2/2004 | Hotz et al. | |
| 2004/0151290 A1 * | 8/2004 | Magarasevic et al. | 379/93.05 |
| 2004/0254926 A1 | 12/2004 | Balogh | |
| 2005/0027882 A1 | 2/2005 | Sullivan et al. | |
| 2005/0105513 A1 | 5/2005 | Sullivan et al. | |
| 2006/0026300 A1 | 2/2006 | Rose | |
| 2006/0034237 A1 | 2/2006 | Patrick et al. | |
| 2006/0101155 A1 | 5/2006 | Damour et al. | |
| 2006/0136573 A1 * | 6/2006 | Loven et al. | 709/219 |
| 2006/0265508 A1 * | 11/2006 | Angel et al. | 709/230 |
| 2007/0070820 A1 | 3/2007 | Gallant | |
| 2007/0100808 A1 | 5/2007 | Balogh | |
| 2007/0153812 A1 | 7/2007 | Kemp | |
| 2007/0238466 A1 | 10/2007 | Buckley et al. | |
| 2007/0294419 A1 | 12/2007 | Ulevitch | |
| 2008/0010365 A1 | 1/2008 | Schneider | |
| 2008/0059152 A1 | 3/2008 | Fridman et al. | |
| 2008/0071909 A1 | 3/2008 | Young et al. | |
| 2008/0114799 A1 | 5/2008 | Chasen | |
| 2008/0133729 A1 | 6/2008 | Fridman et al. | |
| 2008/0155254 A1 | 6/2008 | Stradling | |
| 2008/0201413 A1 | 8/2008 | Sullivan et al. | |
| 2009/0067409 A1 * | 3/2009 | Ku et al. | 370/352 |
| 2009/0106211 A1 | 4/2009 | Balogh | |
| 2009/0106390 A1 | 4/2009 | Kirwan, Jr. et al. | |
| 2009/0157889 A1 | 6/2009 | Treuhaft | |
| 2009/0234960 A1 | 9/2009 | Kamiya et al. | |
| 2009/0235359 A1 | 9/2009 | Abdulhayoglu et al. | |
| 2009/0268715 A1 | 10/2009 | Jansson | |
| 2009/0282027 A1 | 11/2009 | Subotin et al. | |
| 2009/0282028 A1 | 11/2009 | Subotin et al. | |
| 2009/0282038 A1 | 11/2009 | Subotin et al. | |
| 2009/0299748 A1 * | 12/2009 | Basson et al. | 704/270 |
| 2010/0030897 A1 | 2/2010 | Stadling | |
| 2010/0077462 A1 | 3/2010 | Joffe et al. | |
| 2010/0138559 A1 | 6/2010 | Sullivan et al. | |
| 2010/0218040 A1 | 8/2010 | Bodmer et al. | |
| 2010/0257266 A1 | 10/2010 | Holmes et al. | |
| 2010/0274668 A1 | 10/2010 | Langston et al. | |
| 2010/0274836 A1 | 10/2010 | Orentas et al. | |
| 2010/0274970 A1 | 10/2010 | Treuhaft et al. | |
| 2010/0287532 A1 | 11/2010 | Smith et al. | |
| 2010/0318858 A1 | 12/2010 | Essawi et al. | |
| 2011/0022678 A1 | 1/2011 | Smith et al. | |
| 2011/0029662 A1 | 2/2011 | Drees et al. | |
| 2011/0035469 A1 | 2/2011 | Smith et al. | |
| 2011/0035497 A1 | 2/2011 | Daly et al. | |
| 2011/0047292 A1 | 2/2011 | Gould et al. | |
| 2011/0051728 A1 | 3/2011 | Bhogavilli et al. | |
| 2011/0106891 A1 | 5/2011 | Gallant et al. | |
| 2011/0110267 A1 | 5/2011 | Gallant | |
| 2011/0161289 A1 | 6/2011 | Pei et al. | |
| 2011/0179467 A1 * | 7/2011 | Wei et al. | 726/3 |
| 2012/0173685 A1 | 7/2012 | Shorter et al. | |

OTHER PUBLICATIONS

Google prior art Seach.*
International Search Report and Written Opinion of PCT Application No. PCT/US10/41604, mailed Sep. 1, 2010, 8 pages total.
Brown, "The Extensible Provisioning Protocol," for CentralNic Ltd., Oct. 26, 2006, retrieved from the Internet: <<http://uknof.org.uk/uknof5/Brown-EPP/>> on Mar. 26, 2013, 11 pages total.
Extended European Search Report issued Apr. 28, 2014, European Application No. 14160044.5 filed Mar. 14, 2014, pp. 1-13.

* cited by examiner

METHOD AND SYSTEM FOR INTELLIGENT MANY-TO-MANY SERVICE ROUTING OVER EPP

CROSS-REFERENCE TO RELATED APPLICATIONS

The present application for patent is a continuation-in-part of and claims priority to U.S. patent application Ser. No. 13/681,330, filed Nov. 19, 2012, entitled "Method and System for Intelligent Routing of Requests over EPP," pending, and assigned or under obligation of assignment to the same entity as this application and hereby expressly incorporated by reference in its entirety. U.S. patent application Ser. No. 13/681,330 is a continuation of and claims priority to U.S. patent application Ser. No. 12/543,462, filed Aug. 18, 2009, issued Dec. 4, 2012 as U.S. Pat. No. 8,327,019, and also assigned or under obligation of assignment to the same entity as this application and hereby expressly incorporated by reference in its entirety.

FIELD

The present disclosure relates generally to routing requests over a network.

BACKGROUND

As Internet usage grows exponentially, the demand for Internet-related services is also growing rapidly. As a result of the increased usage of the Internet, the demand for domain names is also growing rapidly. Consequently, demand for domain related services is also on the rise. Such domain related services can include domain name creation, domain name registration renewal, and the like. Typically, a website serves as a primary vehicle for establishing an online presence for a domain name. To meet this ever increasing demand for domain name related services, it is necessary that the entities that provide these services do so in an efficient and cost-effective manner.

The Domain Name System ("DNS") is the part of the Internet infrastructure that translates human-readable domain names into the Internet Protocol ("IP") numbers needed to establish TCP/IP communication over the Internet. DNS allows users to refer to web sites, and other resources, using easier to remember domain names, such as "www.example.com", rather than the numeric IP addresses associated with a website, e.g., 123.4.56.78, and assigned to computers on the Internet. Each domain name can be made up of a series of character strings (e.g., labels) separated by dots. The rightmost label in a domain name is known as the top-level domain ("TLD"). Examples of well-known TLDs are "com"; "net"; "org"; and the like. Each TLD supports second-level domains, listed immediately to the left of the TLD, e.g., the "example" level in "www.example.com". Each second-level domain can include a number of third-level domains located immediately to the left of the second-level domain, e.g. the "www" level in www.example.com.

The responsibility for operating each TLD, including maintaining a registry of the second-level domains within the TLD, is delegated to a particular organization, known as a domain name registry ("registry"). The registry is primarily responsible for answering queries for IP addresses associated with domains ("resolving"), typically through DNS servers that maintain such information in large databases, and operating its top-level domain.

For most TLDs, in order to obtain a domain name, that domain name has to be registered with a registry through a domain name registrar, an entity authorized to register Internet domain names on behalf of end-users. Alternatively, an end-user can register a domain name indirectly through one or more layers of resellers. A registry may receive registrations from hundreds of registrars.

A registrar usually has a dedicated service connection with the registries in order to access domain related services, e.g., domain name creation or renewal. Registrars typically use the Extensible Provisioning Protocol ("EPP") as a vehicle to communicate with the registries in order to register or renew domain names. EPP is a protocol designed for allocating objects within registries over the Internet. The EPP protocol is based on Extensible Markup Language ("XML"), which is a structured, text-based format. The underlying network transport is not fixed, although the currently specified method is over Transmission Control Protocol ("TCP").

SUMMARY

Embodiments of the present disclosure relate to systems and methods for routing service requests over EPP. Specifically, a routing system according to various embodiments includes multiple frontend service interfaces, one or more gateways, a management server, and a backend service platform that provides multiple application services. The frontend service interfaces are addressable using virtual IP addresses ("VIP") and can be provided by the gateways. The routing system defines a many-to-many mapping between the frontend service interfaces and a set of backend services provided by the backend service platform. A requestor can send a request over EPP to a targeted service interface to access one or more backend services, by sending the request to a target IP or domain name that corresponds to a VIP associated with the targeted service interface. Using the many-to-many mapping and the VIP of the targeted service interface, the routing system can identify backend services sought by the request and provide the requestor with access to the backend services.

The routing system according to various embodiments can maintain version numbers and/or operational states associated with the version numbers in the many-to-many mapping to support version testing, version upgrades, and version downgrades or rollbacks. In some embodiments, the versioning can be done in conjunction with the VIPs, in the event that a backend service needs to be upgraded on different schedules across the VIPs. In additional embodiments, the versioning can be done independent of the VIPs. Each backend service can be assigned a unique version number and optionally with an operational state defined for each version of the service. A state-machine can be defined for the gateways to determine which service to route requests to with or without using the VIPs as a variable. Embodiments of the state-machine for a backend service can include operational states such as, for example, inactive, past, current, and next. One or more gateways can be configured to route a service request based on a specific operational state of the backend services.

Additional objects and advantages of the embodiments of the disclosure will be set forth in part in the description which follows, and in part will be obvious from the description, or may be learned by practice of the embodiments. The objects and advantages of the embodiments will be realized and attained by means of the elements and combinations particularly pointed out in the appended claims.

It is to be understood that both the foregoing general description and the following detailed description are exemplary and explanatory only and are not restrictive of the embodiments, as claimed.

DETAILED DESCRIPTION

Figure 1:
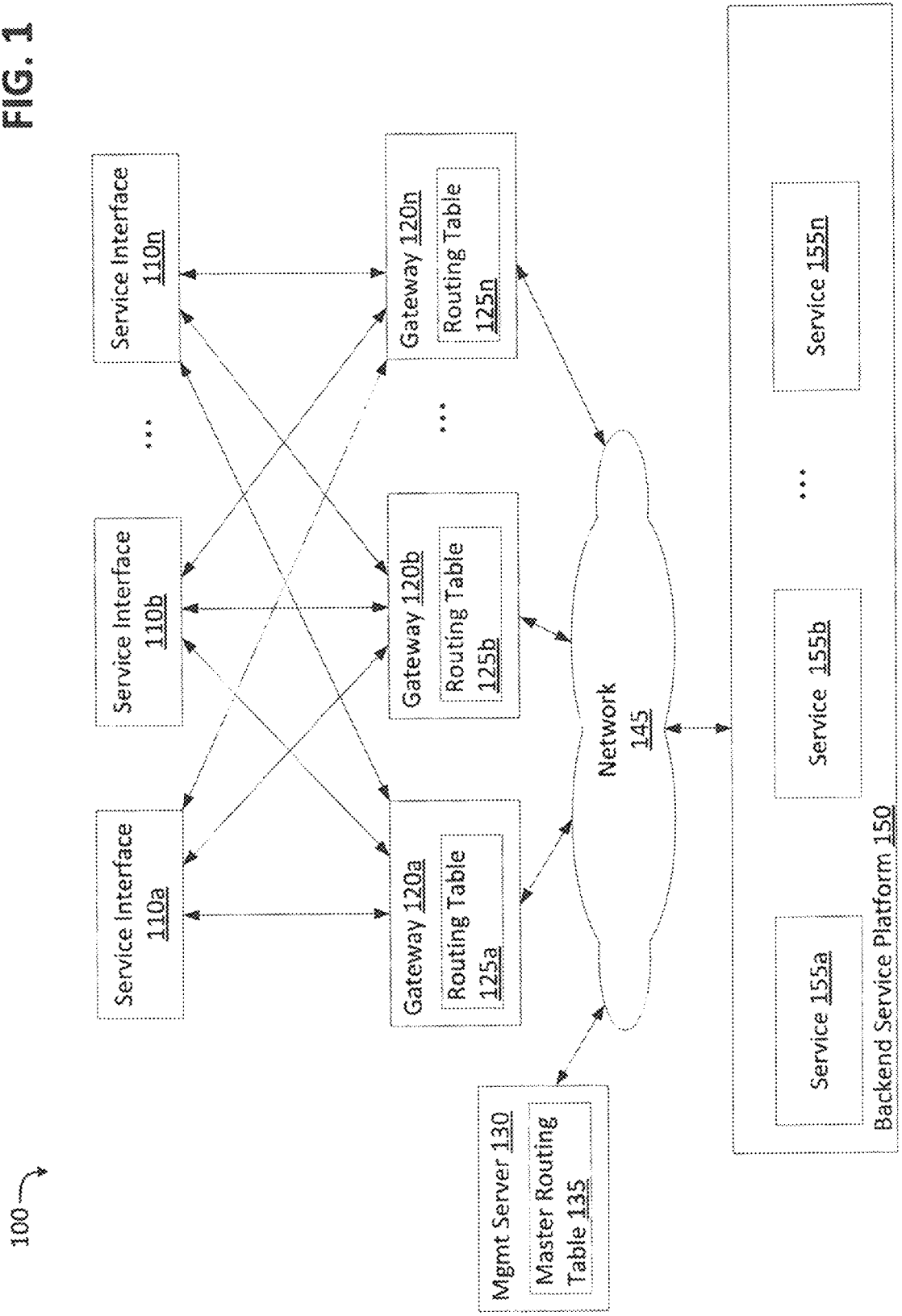
FIG. 1 is a block diagram of an example system for intelligent routing of service requests, consistent with embodiments of the present disclosure.

Reference will now be made in detail to example embodiments, which are illustrated in the accompanying drawings. When appropriate, the same reference numbers are used throughout the drawings to refer to the same or like parts.

For simplicity and illustrative purposes, the principles of the present disclosure are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present disclosure. Moreover, in the following detailed description, references are made to the accompanying figures, which illustrate specific exemplary embodiments. Electrical, mechanical, logical and structural changes may be made to the exemplary embodiments without departing from the spirit and scope of the present disclosure. The following detailed description is, therefore, not to be taken in a limiting sense and the scope of the present disclosure is defined by the appended claims and their equivalents.

Various embodiments of the present disclosure include systems and methods for intelligent routing of requests over EPP. An intelligent routing system according to various embodiments includes multiple frontend service interfaces, one or more gateways, a management server, and a backend service platform that provides multiple application services, such as domain name registry services, domain name suggestion services, and the like. The frontend service interfaces are addressable using virtual IP addresses ("VIPs") and can be provided by the gateways and/or components (e.g., network servers) communicatively coupled to the gateways.

The intelligent routing system can define a many-to-many mapping between the frontend service interfaces and a set of services provided by the backend service platform. A requestor can send a request over EPP to a targeted service interface of the frontend service interfaces to access one or more backend services in the set of services, by sending or directing the request to a target IP or domain name that corresponds to a VIP associated with the targeted service interface. The intelligent routing system can respond to the request by providing an EPP greeting based on the VIP of the targeted service interface. Using the many-to-many mapping and the VIP of the targeted service interface, the intelligent routing system can identify backend services sought by the request and provide (or deny) the requestor with access to the backend services.

In various embodiments, the many-to-many mapping can include VIPs associated with the frontend service interfaces as a high-level routing element to the backend services, and the management server can store the many-to-many mapping in a master routing table. The management server can propagate the many-to-many mapping in the master routing table to the gateways. Alternatively or in addition, the gateways can replicate the many-to-many mapping from the master routing table. Any one of the gateways can determine status information associated with the backend services based on information in a routing table stored locally in that gateway. Any one of the gateways can also receive service requests addressed to one or more of the frontend service interfaces targeted by the service requests, and by using a locally-stored routing table and the VIPs associated with the one or more targeted frontend service interfaces, that gateway can identify backend services sought by the requests and route (or deny) the requests accordingly.

The intelligent routing system can generate and/or update the many-to-many mapping between the VIPs and the backend services in a centralized approach, a de-centralized approach, or a mixed approach (e.g., de-centrally with overrides managed centrally). In the centralized approach, the backend services can register with the management server, and the management server can generate the authoritative routing information. In the de-centralized approach, the backend services can generically register with the management server, and the routing mapping can be configured by an administrator or by an external routing manager application. In the mixed approach, the backend services can publish their desired VIPs, and the management server can override the backend service preferences.

By routing service requests based at least in part on the VIPs associated with the frontend service interfaces, the intelligent routing system can apply different client policies (e.g., connection, bandwidth, security/encryption, quality of service, etc.) to each of the VIPs. In doing so, the intelligent routing system can provide differentiated levels of capabilities and/or apply unique client or access policies based on the VIPs of the frontend service interfaces targeted by the service requests. For example, EPP greetings returned to a new connect request or other service requests for each VIP may include only the services available to that VIP. When responding to a login or connect request, the intelligent routing system can take into account the VIP of the frontend service interface targeted by the login or connect request. Along with a requestor's IP address, login name, password, and digital certificate, the intelligent routing system can use the VIP of the targeted service interface as a factor in making an authentication decision. For example, the gateways can grant or deny authentication through a VIP based on the user's service privileges. The gateway can also grant or deny routing requests to one or more of the backend services based on the routing table and the user's service privileges.

It would be advantageous for the intelligent routing system to route requests over EPP from requestors based on the VIPs of the frontend service interfaces targeted by the requests. For example, registrars and other clients can request services over EPP with a registry in order to register and renew domain names and perform other domain name-related operations. The registry can offer domain name-related services for many types of TLDs (e.g., Brand TLDs, regulated TLDs, unregulated TLDs, etc.), while each registrar can request domain name-related operations for one or a few types of TLDs. The registry or another entity can provide one or more TLD type-specific VIPs to each registrar for making service requests. The registry or another entity can also provide one or more special VIPs to select registrars for making specific types of service requests, such as batch/auto pool. Then, when one of the registrars sends a service request to a VIP designated for a specific type of TLDs or service requests, the intelligent routing system can respond to the service request in a manner appropriate and/or desired for the specific type of TLDs or service requests associated with the VIP.

Furthermore, the intelligent routing system can decrease server infrastructure costs because the same set of gateways and backend service platform can be utilized to provide multiple discrete backend application services. The intelligent routing system can also decrease the level of complexity for requestors and other clients because the intelligent routing system simplifies the connection pool needed to request domain name-related services. Moreover, the intelligent routing system can naturally handle unique client or access policies without requiring the creation of additional stacks of services (e.g., gateways, backend service platforms, and the like). The intelligent routing system can also increase adoption of new backend services because the intelligent routing system can provide new backend services to requestors without requiring the requestors to connect to a new service interface.

In various embodiments, the intelligent routing system can maintain version numbers and/or operational states associated with the backend services in the many-to-many mapping to support version testing, version upgrades, and version downgrades or rollbacks. In some embodiments, the intelligent routing system can factor in the version numbers and/or operational states associated with the backend services when routing service requests, without factoring in the VIPs associated with the backend services. In additional embodiments, when routing service requests, the intelligent routing system can factor in the version numbers and/or operational states associated with the backend services in conjunction with their associated VIPs, in the event that one or more backend services need to be upgraded on different schedules across the VIPs. Each version of a backend service can be assigned a unique version number and optionally with an operational state. A state-machine can be defined for the gateways to determine which service to route requests to with or without using the VIPs as a variable. Embodiments of the state-machine for a backend service can include operational states such as, for example, inactive, past, current, and next. One or more gateways can be configured to route a service request to a service having a specific version number or operational state, like a set of gateways could be configured to sniff test the "next" state, while normal production gateways would be configured only for the "current" state. If there is a need to troubleshoot a service prior to making a decision to rollback, a gateway can be configured for the "past" state. The "inactive" state can serve as a terminal state for an inactive version of a service prior to un-deploying the inactive version of the service.

It would be advantageous for the intelligent routing system to maintain version numbers and/or operational states associated with the backend services, and route requests over EPP based at least in part on the version numbers and/or operational states associated with backend services sought by the requests. By maintaining version numbers and/or operational states associated with the backend services, the intelligent routing system can support version testing, version upgrades, and version downgrades or rollbacks, and allow for selective exposure of new backend services. Furthermore, in doing so, the intelligent routing system can seamlessly handle backend service upgrades without negatively impacting requestors and other clients because the requestors can maintain connections to the frontend service interfaces and the gateways during backend service upgrades. Having the ability to version-test services and seamlessly upgrade services with no or minimal downtime or interruption provides an impetus for the backend service platform to develop and deploy new services, thereby enhancing services provided to the requestors and increasing the backend service platform's competitive advantage.

FIG. 1 illustrates an example system 100 for intelligent routing of service requests received over EPP to one or more services, consistent with the principles of the present disclosure. In various embodiments, an example of which is shown in FIG. 1, system 100 includes frontend service interfaces 110*a-n* and gateways 120*a-n*. Service interfaces 110*0a-n* are addressable using VIPs and can function as service entry points into system 100. A requestor can send a service request over EPP to a targeted service interface (e.g., one of service interfaces 110*a-n*), by sending or directing the request to a target IP or domain name that corresponds to a VIP associated with the targeted service interface.

Gateways 120*a-n* can route service requests received at service interfaces 110*a-n* from one or more requestors. Gateways 120*a-n* and/or components (e.g., network servers) communicatively coupled to gateways 120*a-n* can provide service interfaces 110*0a-n*. Routing tables 125*a-n*, locally stored in gateways 120*a-n*, respectively, are each a many-to-many mapping between service interfaces 110*a-n* and a set of services 155*a-n* provided by a backend service platform 150. Routing tables 125*a-n* can include VIPs associated with service interfaces 110*a-n* as a high-level routing element to the set of services 155*a-n*. Gateways 120*a-n* can use information stored in routing tables 125*a-n* to determine state or status information associated with the set of services 155*a-n*. For example, gateways 120*a-n* can receive connect requests, via service interfaces 110*a-n*, and provide EPP greetings based at least in part on the VIPs of service interfaces 110*a-n* targeted by the requests. When responding to login and/or connect requests, gateways 120*a-n* can take into account the VIPs of service interfaces 110*a-n* targeted by the login and/or connect requests. Along with the requestors' IP addresses, login names, passwords, and digital certificates, gateways 120*a-n* can use the VIPs of the targeted service interfaces as a factor in making authorization or authentication decisions. For instance, gateways 120*a-n* can grant a request to access one or more backend services of services 155*a-n* when the VIP of the service interface targeted by the request is listed in its routing table as authorized to access the one or more backend services.

Figure 2:
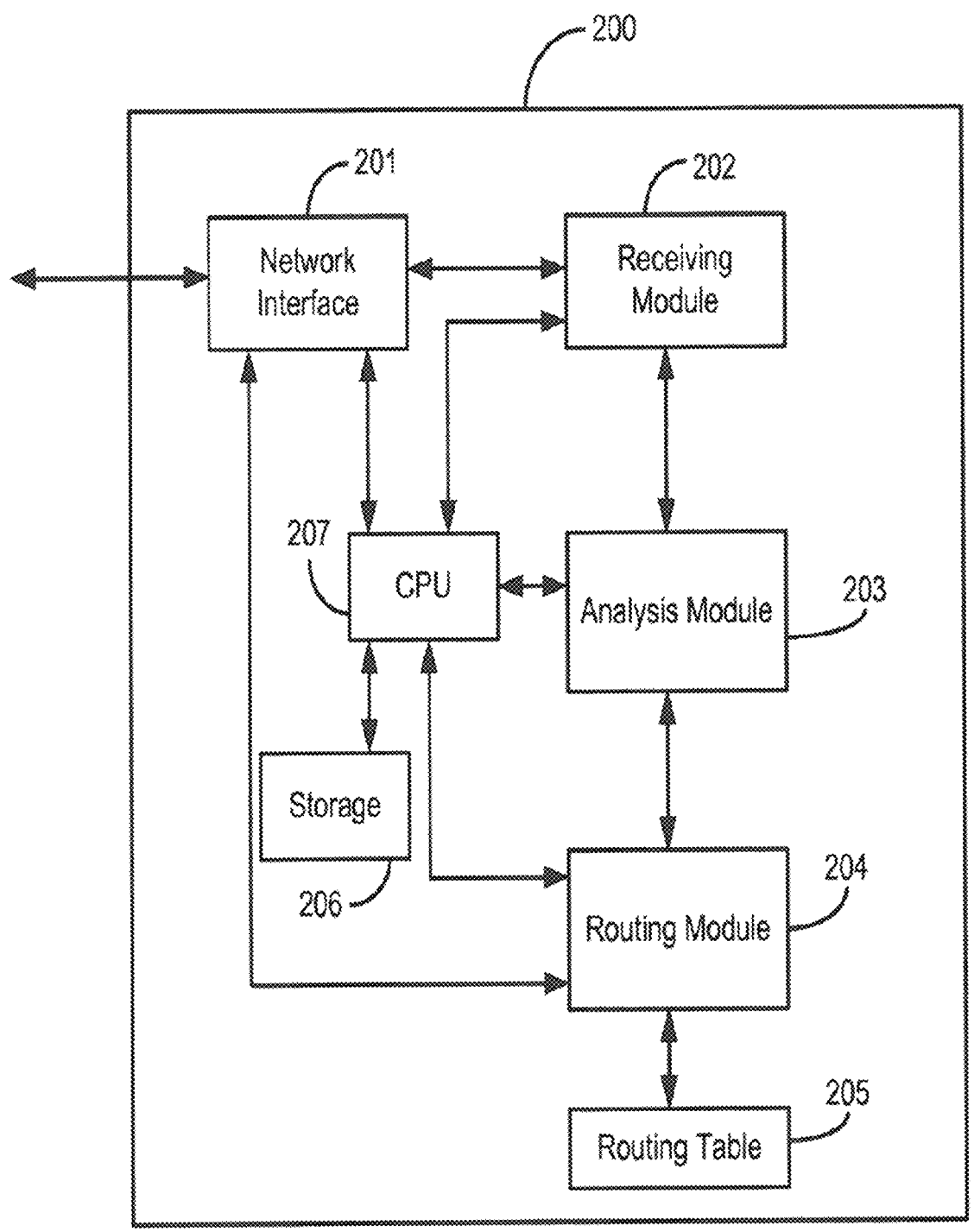
FIG. 2 is block diagram illustrating an example gateway consistent with embodiments of the present disclosure.

Gateways 120*a-n* can use routing tables 125*a-n* to identify services 155*a-n* that are sought by service requests based at least in part on the VIPs associated with service interfaces 110*a-n* targeted by the service requests. After identifying the services 155*a-n* being sought, gateways 120*a-n* can route the service requests to the identified service(s) 155*a-n*. Gateways 120*a-n* can communicate with external systems and networks that are capable of transmitting service requests over EPP. As described earlier, the default transport for EPP is TCP. However, gateways 120*a-n* can be configured to receive and transmit EPP messages over Hypertext Transfer Protocol ("HTTP"), HTTP Secure ("HTTPS"), or other network protocols. Each of gateways 120*a-n* can be any gateway with the requisite functional capability, such as, for example, gateway 200 as shown in FIG. 2 and described in greater detail below.

In various embodiments, routing tables 125*a-n* can store version numbers and/or operational states associated with one or more of services 155*a-n* in the many-to-many mapping. The stored version numbers and/or operational states may support version testing, version upgrades, and version downgrades or rollbacks. Gateways 120*a-n* can perform version-dependent routing in conjunction with the VIPs, in the event that backend services 155*a-n* needs to be upgraded on different schedules across the VIPs. Alternatively, gateways 120*a-n* can perform version-dependent routing independent of the VIPs. Versions of a service (e.g., one of services 155*a-n*) can each be assigned a unique version number and optionally an operational state. A state-machine can be defined for gateways 120*a-n* to determine which version of the service to route requests to with or without using the VIPs as a variable. Embodiments of the state-machine for a service can include operational states such as, for example, inactive, past, current, and next.

As shown in FIG. 1, system 100 can further include a management server 130 and backend service platform 150. Management server 130, backend service platform 150, and gateways 120*a-n* can be communicatively coupled via a network 145. Network 145 can include any combination of one or more wired or wireless communication networks, such as a local area network, a near-field communication link or network, a wide area network, a cellular network, the Internet, a cloud-based network, and the like, or any combination thereof. Management server 130 can maintain a master routing table 135 that contains a many-to-many mapping between VIPs associated with service interfaces 110*a-n* and services 155*a-n* provided by backend service platform 150. Management server 130 can manage routing tables 125*a-n* stored in gateways 120*a-n* by propagating the many-to-many mapping in master routing table 135 to gateways 120*a-n*. Additionally and/or alternatively, management server 130 can manage routing tables 125*a-n* stored in gateways 120*a-n* by allowing gateways 120*a-n* to replicate the many-to-many mapping in master routing table 135.

Management server 130 can generate and/or update the many-to-many mapping between the VIPs and the backend services in a centralized approach, a de-centralized approach, or a mixed approach (e.g., de-centrally with overrides managed centrally). In the centralized approach, services 155*a-n* can register with management server 130, and management server 130 can generate the authoritative routing information for services 155*a-n*. In the de-centralized approach, services 155*a-n* can generically register with management server 130, and the routing mapping can be configured by an external routing manager application or based on preferences provided by services 155*a-n*. In the mixed approach, services 155*a-n* can publish their desired VIPs, and management server 130 can override the preferences provided by services 155*a-n*.

In various embodiments, management server 130 can manage services 155*a-n* and store or provide information related to some or all of services 155*a-n*. Each of services 155*a-n* can communicate its unique information to management server 130. Management server 130 can be a repository of information related to services 155*a-n*. Information provided by each of services 155*a-n* can include its name, authorized and/or preferred VIP(s), version number, operational state, connectivity information, and the like. Additional service-related information for each of services 155*a-n* can include information about its EPP handlers, EPP Poll handlers, and EPP extensions. A system administrator can make updates to any one of services 155*a-n* using an administrative user interface (UI) or application programming interface (API) on management server 130. After the system administrator makes changes to a service 155, management server 130 can automatically communicate the changes made to that service 155 to gateways 120*a-n*. Management server 130 can push this information to gateways 120*a-n*. Alternatively or in addition, gateways 120*a-n* can poll management server 130 to gather information about services 155*a-n*. Each of gateways 120*a-n* can locally store this information in their corresponding routing tables 125*a-n*.

Figure 6:
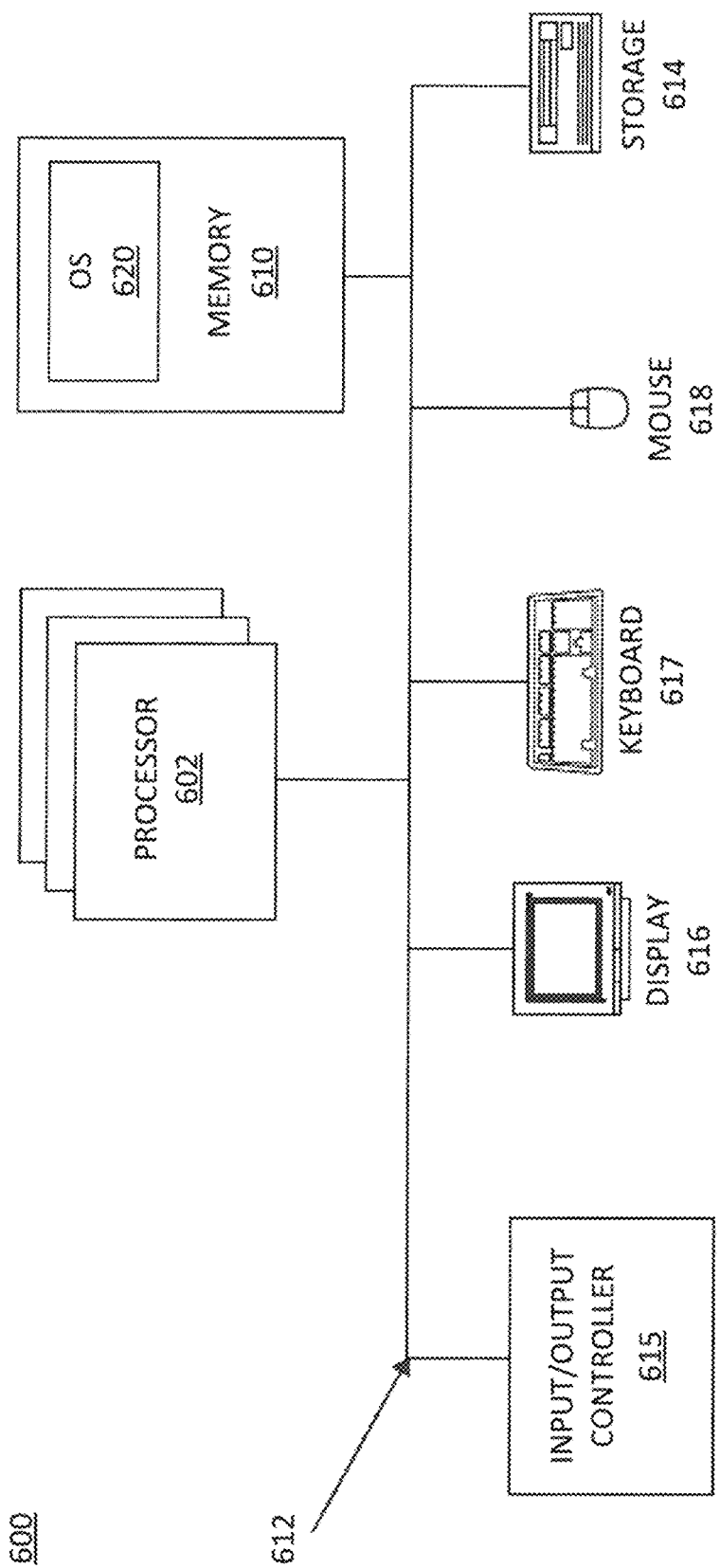
FIG. 6 is an example computer system for performing the disclosed embodiments, consistent with the present disclosure.

Management server 130 can perform various operations on each of services 155*a-n*, such as enable, disable, add, delete, modify, and the like. Management server 130 can also organize related services into a service group. For example, cTLD can be a service group with individual services associated with each of dotTLD1, dotTLD2, and dotTLD3 included as part of the service group. A system administrator can have the ability to control the service group as a single entity and perform operations such as enable, disable, upgrade, etc., on the service group as a whole. Management server 130 can be any computer system with the requisite functional capability, such as a computer system 600 as shown in FIG. 6 and described in greater detail below.

Backend service platform 150 can be a scalable, fault tolerant platform for providing one or more services 155*a-n*. Backend service platform 150 can use one or more protocols to communicate with gateways 120*a-n* and management server 130 via network 145, and can be configured to host multiple services 155*a-n*. Although not shown, backend service platform 150 can include one or more databases to store information related to services 155*a-n* and a user interface to enable a user to provide inputs to management server 130 to control and/or manage activities such as maintenance, upgrades, etc. Services 155*a-n* can either be individual services (e.g., a domain name registry services, a domain name suggestion service, etc.) offered by a registry or a service category with individual services included in each category. Each of services 155*a-n* can be capable of communicating with management server 130 and at least one gateway of gateways 120*a-n*. Each of services 155*a-n* can have unique information associated with it, such as its name, authorized and/or preferred VIP(s), version number, operational state, connectivity information, EPP handlers, EPP Poll handlers, EPP extensions, etc. New services 155 can be deployed and existing services 155 can be modified or un-deployed without affecting the normal functions of backend service platform 150 or other services 155. Backend service platform 150 can be implemented using one or more general purpose servers having the requisite functional capability, such as computer system 600 as shown in FIG. 6 and described in greater detail below. Backend service platform 150 can be implemented in a cluster configuration with each service cluster server including multiple services or service categories. For example, J2EE clustering can be used to organize services 155*a-n*. In such an instance, a service cluster server URL can point to the service cluster server that includes the desired service and a service object identifier can be used to identify the particular service hosted by the server.

Further, while system 100 is described herein with reference to particular blocks, it is to be understood that these blocks are defined for convenience of description and are not intended to imply a particular physical arrangement of component parts. Further, system 100 can have other capabilities not specifically described herein. It will be appreciated that the system configurations and components described herein are illustrative and that variations and modifications are possible. Service interfaces 110a-n, gateways 120a-n, management server 130, network 145, and service platform 150 can have other capabilities not specifically described herein.

FIG. 2 illustrates an example gateway 200 for intelligent routing of service requests received over EPP to one or more services, consistent with the principles of the present disclosure. In various embodiments, an example of which is shown in FIG. 2, gateway 200 can include a network interface module ("NIM") 201. NIM 201 can be configured to communicate with external systems and networks using any one of the conventional wired or wireless mediums. NIM 201 can provide frontend service interfaces that are addressable using VIPs. In addition, NIM 201 can be capable of accepting incoming requests from external systems delivered via EPP over any protocol in the Internet protocol suite, such as, for example, TCP/IP, HTTP, HTTPS, etc. NIM 201 can be communicatively coupled to receiving module 202, and be configured to transmit incoming EPP requests to receiving module 202.

Receiving module 202 can verify that an incoming request is an EPP request by determining the structure of the request and comparing the determined structure of the request with a standard or known EPP structure. Receiving module 202 can be communicatively coupled to analysis module 203, which can receive the incoming request from receiving module 202 and analyze the request. In various embodiments, receiving module 202 and/or analysis module 203 can determine a VIP of a targeted service interface (e.g., one of service interfaces 110a-n) to which the request is initially directed. A requestor can direct the request to the targeted service interface by sending the request to an IP address or a domain name that corresponds to the VIP associated with the targeted service interface 110.

The request can also include XML code that includes XML namespace information. XML namespaces can provide a simple method for qualifying element and attribute names used in XML documents by associating them with namespaces identified by Uniform Resource Identifier ("URI") references. XML namespaces can be used for providing uniquely named elements and attributes in an XML instance. The name of the service sought by the request can be included as part of the elements and/or attribute information. Analysis module 203 can parse the XML code to extract the XML namespace information and identify at least one service being sought by a particular request based on the namespace information. For example, the namespace information can be associated with a name suggestion service. In such an example, parsing of the XML code included in the request would indicate that the request is intended for the name suggestion service. The XML code can include EPP sub-product information in addition to the XML namespace information. In such an instance, the XML namespace information can correspond to a service category, e.g., domain name services, and the sub-product information can specify a particular service within the service category, e.g., dotTLD domain service or name suggestion service. Analysis module 203 can be also be configured to parse the XML code included in the request to determine the namespace information and the EPP extension sub-product element.

Routing module 204 can receive the VIP of the targeted service interface 110 from receiving module 202 or analysis module 203, and identify the service 155 sought by the request based at least in part on the VIP of the targeted service interface 110. Alternatively or in addition, routing module 204 can be configured to identify the service 155 sought by the request only from among services 155 that have a specific version number or operational state. In some embodiments, routing module 204 can consult a routing table 205 to determine whether or not the requested service is available to the requestor based on the VIP of the targeted service interface 110 and/or the version number or operational state of the requested service 155. Routing module 204 can receive the parsed XML from analysis module 203, including an indication of the service sought by the request. In one example embodiment, the targeted service 155 may be determined based on a mode or state setting of the gateway 120 or VIP. If there is a service with multiple entries in the table having an operational state of "past," "active," and "next," the selected service 155 can be based on the operational state defined for that gateway 120 or VIP, which could be set to any one of the supported operational states. For example, a gateway 120 may be configured to route only to services 155 with an operational state of "next," or the gateway 120 may be configured to support all operational states. In either case, however, each VIP may be defined with an operational state. Further, in some embodiments, one VIP may be configured to route to the services having an operational state of "next," and another VIP may be configured to route to the services having an operational state of "active." Routing module 204 can identify the service sought by the request by referencing routing table 205, which is described in greater detail infra. Routing table 205 can be internal or external to routing module 204. In addition to status information, routing module 204 can also ascertain other information about the service, e.g., connectivity information, service name, etc., in order to properly route the request. Routing module 204 can also be configured to route the request upon identification of the service being sought. In certain embodiments, the gateway state and/or the VIP states would be defined outside of routing table 205.

Storage 206 can be implemented using any non-transitory computer storage medium, such as disks, flash memory, and the like. Storage 206 can store routing table 205, and can also store other information like program instructions for providing frontend service interfaces, analyzing incoming service requests, determining VIPs associated with service interfaces targeted by the service requests, performing XML code analysis, routing the service requests, etc. CPU 207, which can be implemented as one or more integrated circuits (e.g., a conventional microprocessor or microcontroller), can control the operation of gateway 200. CPU 207 can retrieve one or more program instructions stored in storage 206 and execute the one or more programs to instruct and/or cause analysis module 203 and/or routing module 204 to perform certain functions.

Further, while gateway 200 is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of devices including electronic devices implemented using any combination of circuitry and software.

Figure 3:
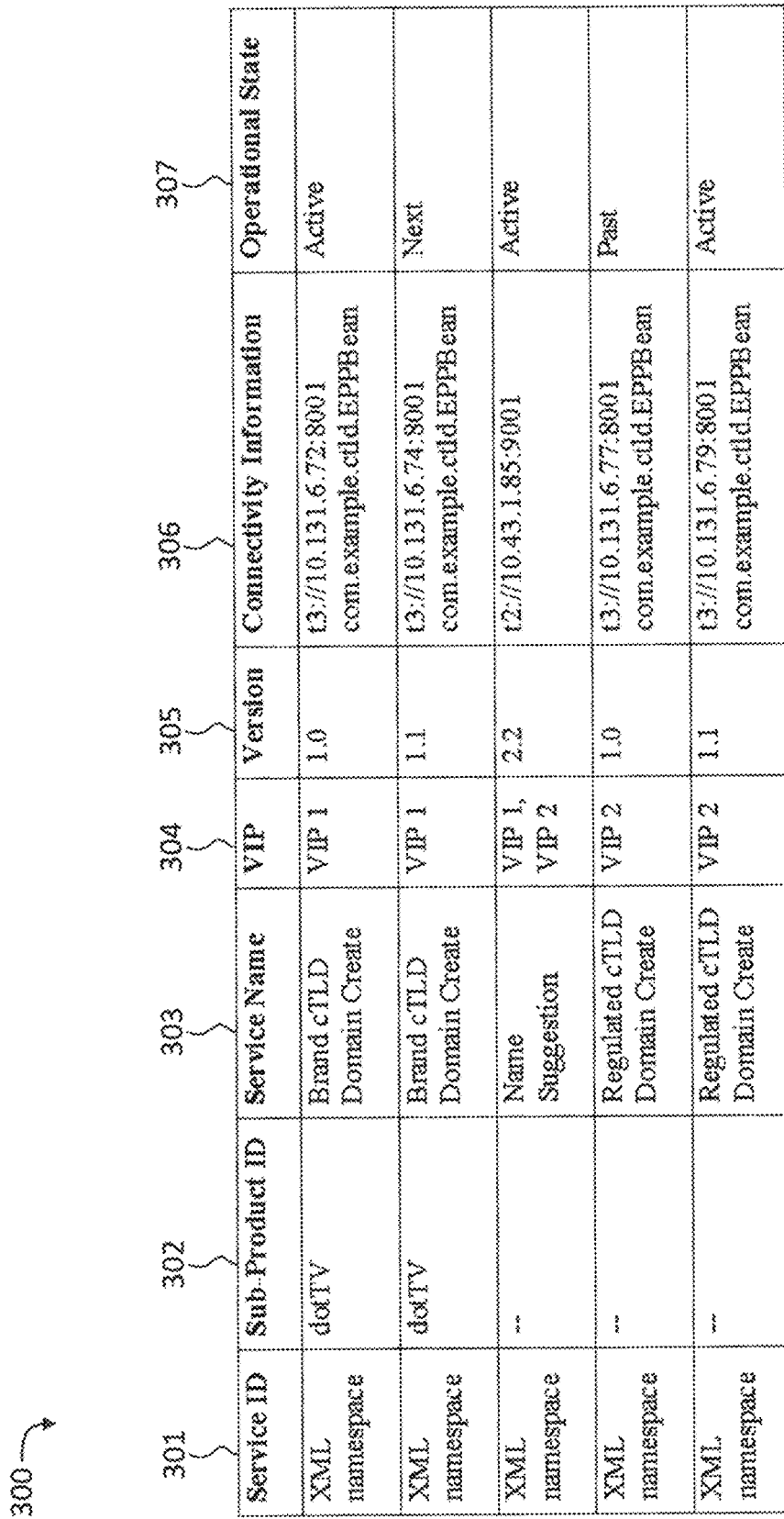
FIG. 3 depicts an example routing table consistent with embodiments of the present disclosure.

FIG. 3 illustrates a routing table 300 used by system 100 to provide intelligent routing of service requests received over EPP to one or more services, consistent with the principles of the present disclosure. In various embodiments, an example of which is shown in FIG. 3, muting table 300 can include information associated with available services (e.g., services 155a-n). Routing table 300 can include a service ID 301 for the services, which can correspond to XML namespace information contained in a service request. Routing table 300 can also include sub-product information 302 for the services. As discussed supra, sub-product information 302 can be an individual service within a group of services or a category within a service group. For example, as illustrated in FIG. 3, the sub-product dotTLD is part of a "cTLD" service group. In some embodiments, sub-product information 302 may be required when the XML namespace and/or VIP itself are not enough to uniquely identify the targeted service. This information can be helpful in directing a service request to a particular service or category within a service group. Services that belong to a group can have associated sub-product information 302. Routing table 300 can also include a service name 303, e.g., "Brand cTLD Domain Create," "Name Suggestion," and the like.

Routing table 300 can include a version number 305 for each of the services 155, which can be required in instances where multiple versions of a particular service are operating concurrently. In such instances, version number 305 can be helpful in directing a service request to an appropriate version of the particular service. Routing table 300 can include connectivity information 306, which can include URLs or addresses associated with the services or service cluster servers, as described supra. A gateway (e.g., one of gateways 120a-n) can use the URL or address information to route incoming service requests. Connectivity information 306 can additionally include routing information for objects within the services to which requests for those services should be sent.

Routing table 300 can include an operational state 307 of the services. Examples of operational states can include inactive, past, current, and next. Additional examples of operational states can include disabled, offline, temporarily unavailable, and the like. Requests for a service can be routed based on, for example, a version number and/or an operational state of the service. Moreover, in some embodiments, gateway 200 can be configured to route the request based on a version number 305 and/or an operational state 307 of the service. For example, a set of gateways can be set up to sniff test a new version of a particular service, and thus that set of gateways can route service requests for that particular service based on a mapping in routing table 300 with a version number 305 that is greater (i.e., newer) than a current version. In such an example, gateway 200 may have an operation state 307 that is set to "next." Additionally and/or alternatively, each VIP may have a defined operational state that allows a single gateway configured for any state to drive the routing decisions. In the meantime, normal production gateways can be set up to continue routing requests for that particular service based on a mapping in routing table 300 with version number 305 matching a current version and/or operational state 307 set to "current." If there is a need to troubleshoot a service prior to making a decision to rollback, a gateway 200 can be set up to route requests for that particular service based on a mapping in routing table 300 with version number 305 that is smaller (i.e., older) than a current version and/or operational state 307 that is set to "past."

Routing table 300 can be dynamically updated each time a change is made to a service or a service group or category. Alternatively, routing table 300 can be updated periodically. Information included in routing table 300 can be supplied by a central management server (e.g., management server 130). Alternatively or in addition, routing table 300 can obtain information from various sources, such as the central management server, a service platform (e.g., backend service platform 150), an external routing manager application, and the like. In some instances, information for one or more services and/or service categories included in routing table 300 can be fixed and/or updated manually. Although routing table 300 has been described with reference to certain information, it will be appreciated that the information shown is for illustrative purposes only. One skilled in the art would realize that routing table 300 can have other information in lieu of or in addition to the information illustrated in FIG. 3.

Figure 4:
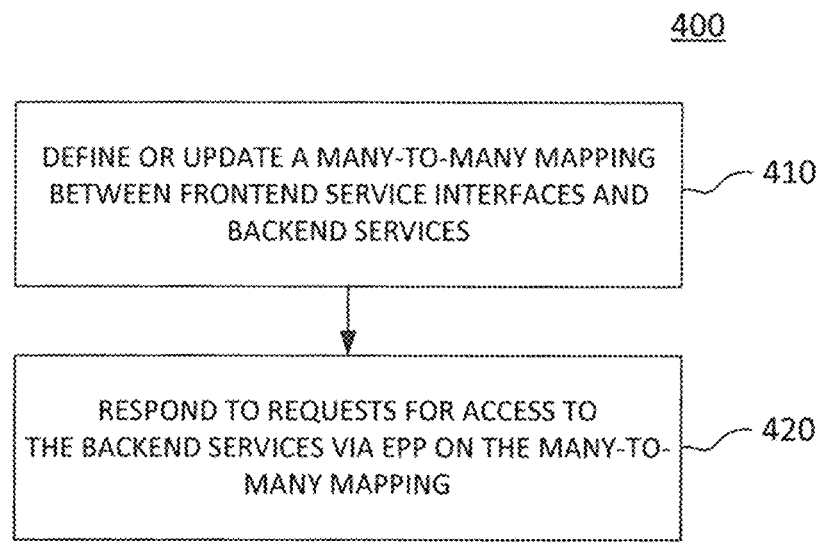
FIG. 4 is a flow diagram of an example process performed by an intelligent routing system for managing a many-to-many mapping and responding to service requests over EPP based on the many-to-many mapping, consistent with embodiments of the present disclosure.

FIG. 4 is a flow diagram of a process 400 performed by an intelligent routing system (e.g., system 100 as shown in FIG. 1) to define or update a many-to-many mapping and respond to service requests over EPP based on the many-to-many mapping, according to embodiments of the present disclosure. At block 410, the intelligent routing system can define or update a many-to-many mapping between frontend service interfaces and backend services. Alternatively or in addition, the intelligent routing system can assign version numbers to some or all of the backend services and define or update a many-to-many mapping between different versions of the backend services and their operational states. A management server of the intelligent routing system can store the many-to-many mapping in a master routing table. The management server can propagate the many-to-many mapping in the master routing table to gateways (e.g., gateways 120a-n) in the intelligent routing system. Alternatively or in addition, the gateways can replicate the many-to-many mapping from the master routing table. Next; at block 420, the intelligent routing system can respond to requests for access to the backend services over EPP based at least in part on the many-to-many mapping. Block 420 is described in greater detail infra with respect to FIG. 5.

Figure 5:
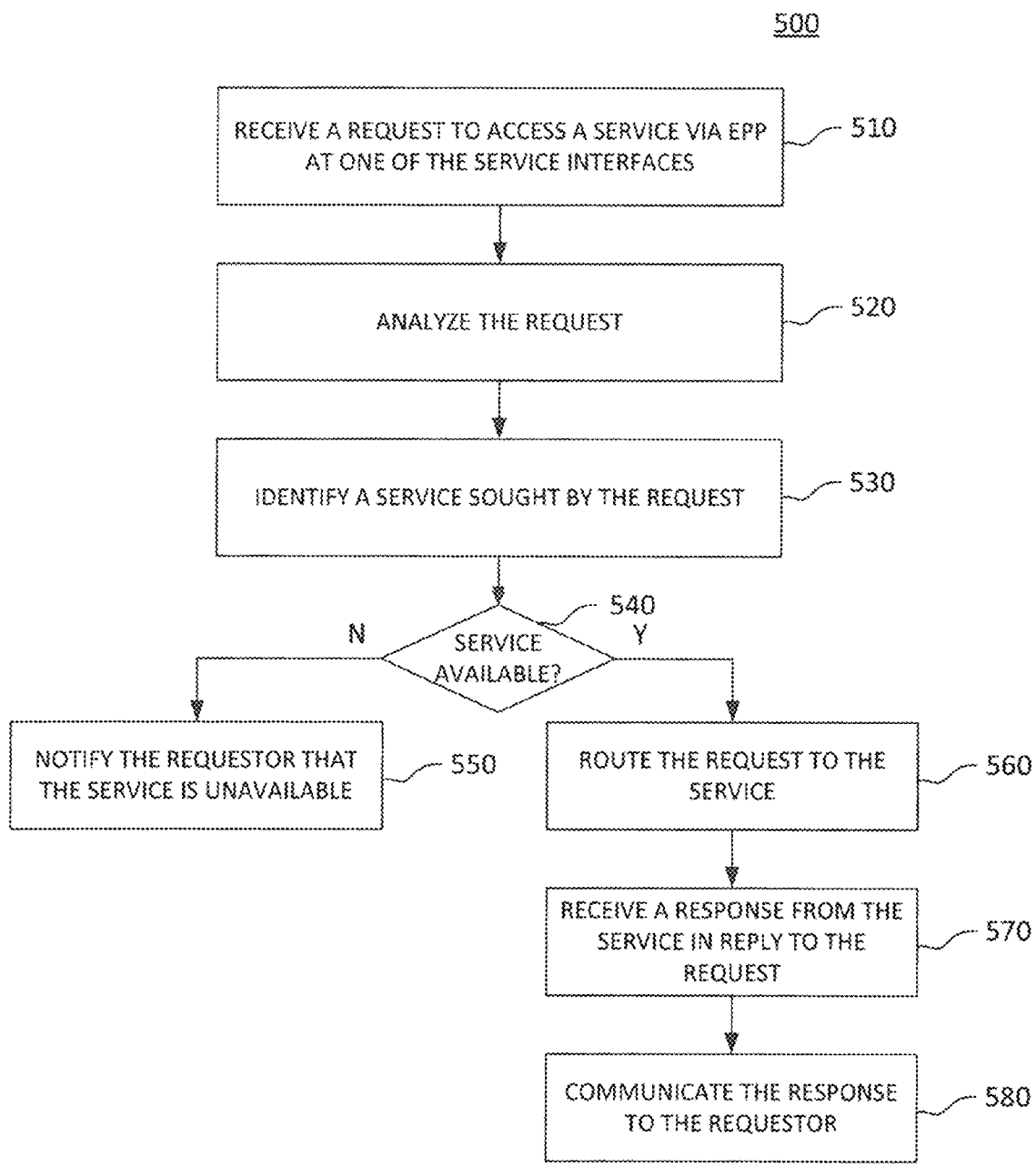
FIG. 5 is a flow diagram of an example process performed by the intelligent routing system for responding to a service request over EPP, consistent with embodiments of the present disclosure.

FIG. 5 is a flow diagram of a process 500 performed by intelligent routing system 100 to respond to a service request over EPP, according to embodiments of the present disclosure. Process 500 can be performed by a gateway, such as one of gateways 120a-n as shown in FIG. 1. At block 510, the gateway can receive a request from a requestor to access one or more backend services provided by a backend service platform, such as a registry. The requestor can send the request over EPP to a targeted service interface of the frontend service interfaces, by sending or directing the request to a target IP or domain name that corresponds to a VIP associated with the targeted service interface. Then, at block 520, the gateway can analyze the request. For example, the gateway can determine the VIP associated with the targeted service interface that received the request. The gateway can also verify that the request is an EPP request by determining the structure of the request and comparing the structure of the request with a standard EPP structure.

At block 530, the gateway can identify at least one service sought by the request. For example, the gateway can identify the service sought by the request based at least in part on the VIP associated with the targeted service interface. Alternatively or in addition, the gateway can identify the service sought by the request based on version numbers and/or operational states associated with the service, the gateway, and the VIP. For instance, if the gateway is configured to sniff test new services or new versions of existing services, then the gateway can look for the service sought by the request in the many-to-many mapping where the version number is greater (i.e., newer) than a current version and/or the operational state set is to "next." If the gateway is configured as a production gateway, then the gateway can look for the service sought by the request in the many-to-many mapping where the version number matches a current version and/or the operational state set is to "current." And if there is a need to troubleshoot a service prior to making a decision to rollback, then the gateway can look for the service sought by the request in the many-to-many mapping where the version number is smaller (i.e., older) than a current version or the operational state set is to "past." Moreover, the gateway can provide an EPP greeting to the request if the service requested is login or connect, wherein the EPP greeting can include only services available to the VIP associated with the targeted service interface. The VIP can be defined with an operational state that allows the gateway to dynamically select the target services that match the VIP operational state.

After the gateway identifies the service sought by the request, at block 540 the gateway can determine whether or not the identified service is available to the requestor. For example, if the service is offline, the gateway can send a message indicating unavailability of the service at block 550. The unavailability message can include additional information that the system administrator wants to convey to the requestor, such as the time the service went offline, expected service reactivation time, etc. If at block 540 the gateway determines that the service is available, then at block 560 the gateway can route the request to the identified service. At block 570, the gateway can receive a response from the identified service in reply to the request. For example, the response can be a request completion message indicating that the request has been processed. Finally, the completion message can be communicated to the requestor at block 580. For example, the identified service can send the completion message to the gateway, which in turn forwards the completion message to the requestor. The completion message can include additional information not communicated to the requestor, such as metadata specifying additional information about the request, e.g., execution time of the request. Such information may be required as part of a Service Level Agreement ("SLA") negotiated by the service provider. The metadata information can be used to verify that the promised SLA criteria, e.g., execution time of a request, are being met by the service provider. The gateway can also log the metadata information for future use and only forward the completion message to the requestor.

It will be appreciated that process 500 described herein is illustrative and that variations and modifications are possible. Acts described as sequential can be executed in parallel, order of acts can be varied, and acts can be modified or combined. For instance, step 405 can be omitted and the request can be sent to the service without verifying a current status of the service. In some embodiments, blocks 520 and 530 can be combined to concurrently analyze the request and identify the service sought by the request.

While the disclosure has been described with respect to specific embodiments, those skilled in the art will recognize that numerous modifications are possible. For instance, the gateway and the management server can have additional functionalities not mentioned herein. In addition, embodiments of the present disclosure can be realized using any combination of dedicated components and/or programmable processors and/or other programmable devices. While the embodiments described above can make reference to specific hardware and software components, those skilled in the art will appreciate that different combinations of hardware and/or software components can also be used and that particular operations described as being implemented in hardware might also be implemented in software or vice versa.

FIG. 6 illustrates a computer system 600 that is consistent with embodiments of the present disclosure. In general, embodiments of a management server (e.g., management server 130) or a gateway (e.g., one of gateways 120*a*-*n*) in the intelligent routing system may be implemented in various computer systems, such as a personal computer, a server, a workstation, an embedded system, a multifunction device, or a combination thereof. Certain embodiments of the printer driver may be embedded as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. However, for purposes of explanation, system 600 is shown as a general purpose computer that is well known to those skilled in the art. Examples of the components that may be included in system 600 will now be described.

As shown, system 600 may include at least one processor 602, a keyboard 617, a pointing device 618 (e.g., a mouse, a touchpad, and the like), a display 616, main memory 610, an input/output controller 615, and a storage device 614. Storage device 614 can comprise, for example, RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. A copy of the computer program embodiment of the printer driver can be stored on, for example, storage device 614. System 600 may also be provided with additional input/output devices, such as a printer (not shown). The various components of system 600 communicate through a system bus 612 or similar architecture. In addition, system 600 may include an operating system (OS) 620 that resides in memory 610 during operation. One skilled in the art will recognize that system 600 may include multiple processors 602. For example, system 600 may include multiple copies of the same processor. Alternatively, system 600 may include a heterogeneous mix of various types of processors. For example, system 600 may use one processor as a primary processor and other processors as co-processors. For another example, system 600 may include one or more multi-core processors and one or more single core processors. Thus, system 600 may include any number of execution cores across a set of processors (e.g., processor 602). As to keyboard 617, pointing device 618, and display 616, these components may be implemented using components that are well known to those skilled in the art. One skilled in the art will also recognize that other components and peripherals may be included in system 600.

Main memory 610 serves as a primary storage area of system 600 and holds data that is actively used by applications, such as the printer driver in the barcode printing system, running on processor 602. One skilled in the art will recognize that applications are software programs that each contains a set of computer instructions for instructing system 600 to perform a set of specific tasks during runtime, and that the term "applications" may be used interchangeably with application software, application programs, device drivers, and/or programs in accordance with embodiments of the present teachings. Memory 610 may be implemented as a random access memory or other forms of memory as described below, which are well known to those skilled in the art.

OS 620 is an integrated collection of routines and instructions that are responsible for the direct control and management of hardware in system 600 and system operations. Additionally, OS 620 provides a foundation upon which to run application software and device drivers. For example, OS 620 may perform services, such as resource allocation, scheduling, input/output control, and memory management. OS 620 may be predominantly software, but may also contain partial or complete hardware implementations and firmware. Well known examples of operating systems that are consistent with the principles of the present teachings include MICROSOFT WINDOWS (e.g., WINDOWS CE, WINDOWS NT, WINDOWS 2000, WINDOWS XP, and WINDOWS VISTA), MAC OS, LINUX, UNIX, ORACLE SOLARIS, OPEN VMS, and IBM AIX.

The foregoing description is illustrative, and variations in configuration and implementation may occur to persons skilled in the art. For instance, the various illustrative logics, logical blocks, modules, and circuits described in connection with the embodiments disclosed herein may be implemented or performed with a general purpose processor (e.g., processor 402), a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

If implemented in software, the functions may be stored on or transmitted over a computer-readable medium as one or more instructions or code. Computer-readable media includes both tangible, non-transitory computer storage media and communication media including any medium that facilitates transfer of a computer program from one place to another. A storage media may be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

Resources described as singular or integrated can in one embodiment be plural or distributed, and resources described as multiple or distributed can in embodiments be combined. The scope of the present teachings is accordingly intended to be limited only by the following claims. Although the invention has been described with respect to specific embodiments, it will be appreciated that the invention is intended to cover all modifications and equivalents within the scope of the following claims.

What is claimed is:

1. A computer-implemented method for routing requests received using Extensible Provisioning Protocol (EPP) to a plurality of services, the method comprising:
   receiving, at a gateway via the EPP from a requestor, a request to access a service from among the plurality of services, the gateway providing a plurality of addressable service interfaces, wherein the request is directed to a target service interface of the plurality of addressable service interfaces via an address associated with the target service interface;
   analyzing the request to determine the address associated with the target service interface;
   identifying the service sought by the request based on information in a routing table corresponding to the address associated with the target service interface, wherein the routing table includes a many-to-many mapping between the plurality of service interfaces and the plurality of services; and
   routing, by the gateway, the request to the service thereby providing the requestor with access to the service.

2. The computer-implemented method of claim 1, further comprising:
   determining a current version of the service based on the information in the routing table; and
   routing the request to the current version of the service.

3. The computer-implemented method of claim 1, further comprising:
   determining a current version of the service based on the information in the routing table; and
   routing the request to a different version of the service.

4. The computer-implemented method of claim 1, further comprising:
   determining an operational state of the service based on the information in the routing table; and
   routing the request to the service based on the operational state of the service.

5. The computer-implemented method of claim 1, further comprising:
   determining an operational state of the service based on the information in the routing table; and
   routing the request to the service based on the address associated with the target service interface and the operational state of the service.

6. The computer-implemented method of claim 1, wherein identifying the service further comprises:

providing to the requestor an EPP greeting that includes one or more services available to the requestor based on the address associated with the target service interface.

7. The computer-implemented method of claim 1, wherein identifying the service further comprises:
   determining an authorization of the requestor to access the service sought by the request based on the address associated with the target service interface.

8. The computer-implemented method of claim 1, wherein identifying the service further comprises:
   determining an access policy based on the address associated with the target service interface; and
   determining an authorization of the requestor to access the service sought by the request based on the access policy.

9. The computer-implemented method of claim 1, further comprising:
   defining the many-to-many mapping between the plurality of addressable service interfaces and the plurality of services, wherein the plurality of addressable service interfaces each has a unique address.

10. The computer-implemented method of claim 9, further comprising:
    updating the routing table with the many-to-many mapping.

11. A system for routing requests received using Extensible Provisioning Protocol (EPP) to a plurality of services, comprising:
    a processor; and
    a memory communicatively coupled to the processor;
    wherein the processor is configured to perform operations comprising:
       receiving, at a gateway via the EPP from a requestor, a request to access a service from among the plurality of services, the gateway providing a plurality of addressable service interfaces, the request being directed to a target service interface of the plurality of addressable service interfaces via an address associated with the target service interface;
       analyzing the request to determine the address associated with the target service interface;
       identifying the service sought by the request based on information in a routing table corresponding to the address associated with the target service interface, wherein the routing table is stored in the memory and includes a many-to-many mapping between the plurality of service interfaces and the plurality of services; and
       routing, by the gateway, the request to the service thereby providing the requestor with access to the service.

12. The system of claim 11, wherein the processor is further configured to perform operations comprising:
    determining a current version of the service based on the information in the routing table; and
    routing the request to the current version of the service.

13. The system of claim 11, wherein the processor is further configured to perform operations comprising:
    determining a current version of the service based on the information in the routing table; and
    routing the request to a different version of the service.

14. The system of claim 11, wherein the processor is further configured to perform operations comprising:
    determining an operational state of the service based on the information in the routing table; and
    routing the request to the service based on the operational state of the service.

15. The system of claim 11, wherein the processor is further configured to perform operations comprising:
    determining an operational state of the service based on the information in the routing table; and
    routing the request to the service based on the address associated with the target service interface and the operational state of the service.

16. The system of claim 11, wherein the processor is further configured to perform operations comprising:
    providing to the requestor an EPP greeting that includes one or more services available to the requestor based on the address associated with the target service interface.

17. The system of claim 11, wherein the processor is further configured to perform operations comprising:
    determining an authorization of the requestor to access the service sought by the request based on the address associated with the target service interface.

18. A non-transitory computer-readable storage medium including instructions which when executed by a processor within a device, causes the processor to execute a method for routing requests received using Extensible Provisioning Protocol (EPP) to a plurality of services, the method comprising:
    receiving, at a gateway via the EPP from a requestor, a request to access a service from among the plurality of services, the gateway providing a plurality of addressable service interfaces, wherein the request is directed to a target service interface of the plurality of addressable service interfaces via an address associated with the target service interface;
    analyzing the request to determine the address associated with the target service interface;
    identifying the service sought by the request based on information in a routing table corresponding to the address associated with the target service interface, wherein the routing table includes a many-to-many mapping between the plurality of service interfaces and the plurality of services; and
    routing, by the gateway, the request to the service thereby providing the requestor with access to the service.

19. The non-transitory computer-readable storage medium of claim 18, wherein the method further comprises:
    determining a current version of the service based on the information in the routing table; and
    routing the request to the current version of the service.

20. The non-transitory computer-readable storage medium of claim 18, wherein the method further comprises:
    determining a current version of the service based on the information in the routing table; and
    routing the request to a different version of the service.

21. The non-transitory computer-readable storage medium of claim 18, wherein the method further comprises:
    determining an operational state of the service based on the information in the routing table; and
    routing the request to the service based on the operational state of the service.

22. The non-transitory computer-readable storage medium of claim 18, wherein the method further comprises:
    determining an operational state of the service based on the information in the routing table; and
    routing the request to the service based on the address associated with the target service interface and the operational state of the service.

23. The non-transitory computer-readable storage medium of claim 18, wherein identifying the service further comprises:

providing to the requestor an EPP greeting that includes one or more services available to the requestor based on the address associated with the target service interface.

24. The non-transitory computer-readable storage medium of claim 18, wherein identifying the service further comprises:
   determining an authorization of the requestor to access the service sought by the request based on the address associated with the target service interface.

25. The non-transitory computer-readable storage medium of claim 18, wherein identifying the service further comprises:
   determining an access policy based on the address associated with the target service interface; and
   determining an authorization of the requestor to access the service sought by the request based on the access policy.

26. The non-transitory computer-readable storage medium of claim 18, wherein the method further comprises:
   defining the many-to-many mapping between the plurality of addressable service interfaces and the plurality of services, wherein the plurality of addressable service interfaces each has a unique address.

27. A computer-implemented method for routing requests received using Extensible Provisioning Protocol (EPP) to a plurality of services, the method comprising:

receiving, at a gateway via the EPP from a requestor, a request to access a service from among the plurality of services, the gateway providing a plurality of addressable service interfaces, wherein the request is directed to a target service interface of the plurality of addressable service interfaces via an address associated with the target service interface;

analyzing the request to determine the address associated with the target service interface;

identifying the service sought by the request based on information in a routing table associated with the address associated with the target service interface, wherein the routing table includes a many-to-many mapping between the plurality of addressable service interfaces and the plurality of services;

determining an operational state of the service based on the information in the routing table; and routing the request to the service based on the associated with the target service interface and the operational state of the service, thereby providing the requestor with access to the service.

* * * * *

UNITED STATES PATENT AND TRADEMARK OFFICE
CERTIFICATE OF CORRECTION

| | |
|---|---|
| PATENT NO. | : 8,856,344 B2 |
| APPLICATION NO. | : 13/835674 |
| DATED | : October 7, 2014 |
| INVENTOR(S) | : James Gould et al. |

It is certified that error appears in the above-identified patent and that said Letters Patent is hereby corrected as shown below:

On the Title Page

(72) Inventors: "James Gould, Leesburg, VA (US); Marc Anderston, Ashburn, VA (US); Mahendra Jain, Sterling, VA (US)"
should read -- James Gould, Leesburg, VA (US); Marc Anderston, Ashburn, VA (US); Mahendra Jain, Sterling, VA (US); Raja Chawat, Reston, VA (US) --

Signed and Sealed this
Tenth Day of March, 2015

Michelle K. Lee
*Deputy Director of the United States Patent and Trademark Office*